Aug. 24, 1926.

W. F. GRAFFIS 1,597,594

RIM TOOL

Filed March 22, 1926

INVENTOR
W. F. Graffis
BY
James J. Shetty
ATTORNEYS

Patented Aug. 24, 1926.

1,597,594

UNITED STATES PATENT OFFICE.

WILLIAM F. GRAFFIS, OF STREATOR, ILLINOIS.

RIM TOOL.

Application filed March 22, 1926. Serial No. 96,606.

My present invention pertains to tire rim remover tool and it contemplates the provision of a simple and inexpensive tool through the medium of which a tire may be removed from a demountable rim with the expenditure of but a slight amount of effort.

The invention further contemplates the provision of a tool of the characted set forth that is adapted to be used for removing a tire from a demountable rim or vice versa regardless of the size of the rim and the device is also adapted to permit of the replacement of the rim with respect to the tire.

The invention further contemplates the provision of a simple and inexpensive tool for removing a demountable rim from a tire and is so constructed and arranged that a person of very slight build will be enabled to operate the tool with but a small amount of effort.

Other objects and advantageous features of the invention will be fully understood from the following description and claim when the same are read in connection with the drawings accompanying and forming part of this specification, in which;

Similar numerals of reference designate corresponding parts in all the views of the drawings.

Figure 1:
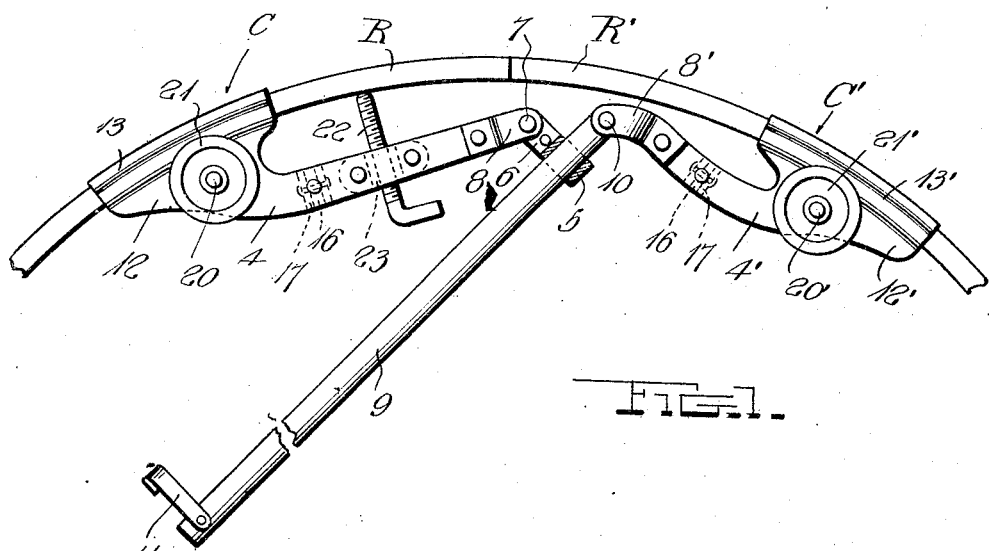
Figure 1 is a side elevation of my novel device and illustrating a portion of a rim showing the manner in which the rim and tool appear when closing the joint of the rim. The rim in this view is shown immediately after it has been placed on the tire and before the tool has been removed from said rim.

I illustrate the meeting ends R and R' of a demountable rim and the clamps, two in number are designated as a whole by C and C'. Each of the clamps C and C' are provided with arms 4 and 4' and pivoted at 7 is a collar 5. The arm 4 is provided with a bifurcated end 8 while the arm 4' is provided with a bifurcated end 8'. The collar 5 is further provided with a clamping lug 6. The ends of the arms 4 and 4' terminate in portions 12 and 12' and the collar 5 is secured in slidable manner on the lever 9 that is preferably formed of pipe or other inexpensive material and at its lower end, the bifurcated portion of the arm 4' is pivoted to the lever as indicated by 10.

Each of the ends 12 and 12' are identically constructed and terminate in lock flanges 13 and 13'. These lock flanges in turn are provided with movable gripping ends 14. The lock flanges are further provided with an arm 15 having a lateral end 16 and a U bracket 17 whereby the ends 12 and 12' are secured to the members 14. The member or arm 15 is pivoted to the U bracket at 18 and secured to the lower end of the movable clamp member 14 is a lock flange 19. These elements are identical on both clamps and I therefore considered it unnecessary to illustrate more than one of the clamps.

Passing through the widened ends 12 and 12' and through the arms 15 of each of the clamps are bolts 20 and 20' that are provided with a head at one end and a thumb nut 21 and 21' at the other.

Arranged in the approximate center with respect to the length of the arm 4 is a bearing 23 to receive a screw 22 for an important purpose hereinafter specified.

Figure 2:
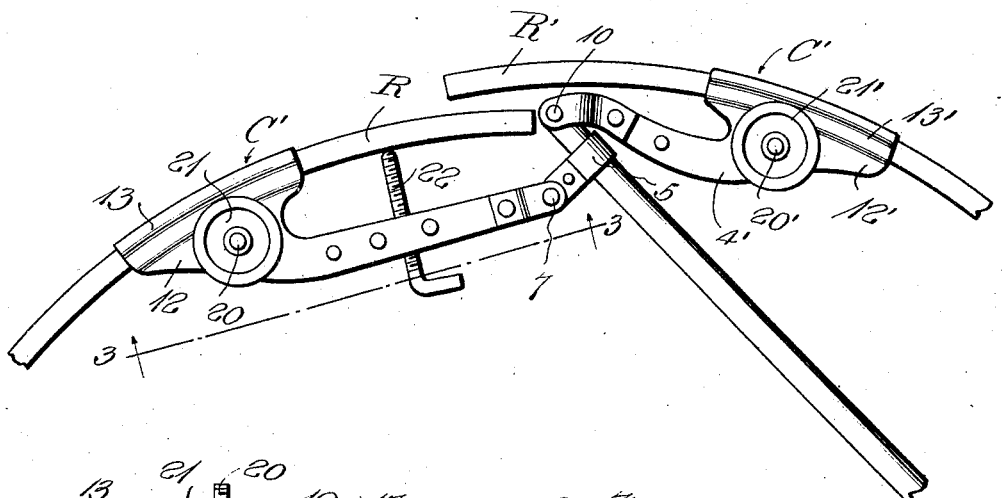
Figure 2 is a view showing the manner in which the ends of the rim are contracted for removal of the rim from the time.
Figure 3:
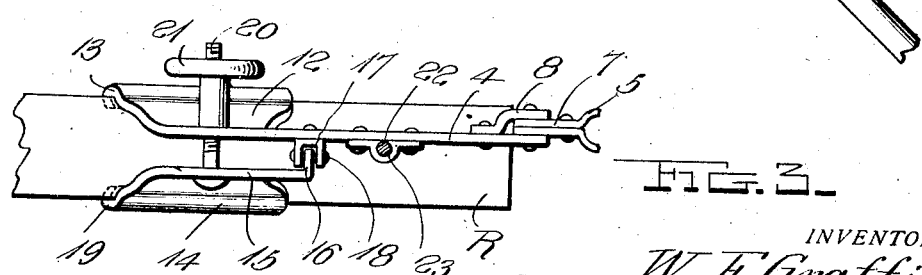
Figure 3 is an inverted view of one of the gripping clamps of the tool.

In the practical use of the invention, when it is desired to remove a rim from a tire, the lock flanges 13 and 13' and the lock flanges 19 of the clamp C and C' are properly positioned so as to engage the rim with the lever 9 at the angle shown in Figure 1. The thumb-nut 21 is then adjusted so that lock flanges will securely engage the edges of the rim and the screw 22 is turned down or adjusted so as to bear against the outer surface of the rim. The removal operation is accomplished or in other words, the splitting of the rim to the position shown in Figure 2 is brought about by merely moving the lever 9 to the right. This will decrease the circumference of the rim with respect to the tire and the tire may then be easily pulled away from the rim. Any repairing of the tire may then be accomplished with the rim remaining in the clamp as it has been removed from the tire and the replacement of the rim with respect to the tire is accomplished by placing of a portion of the tire on the rim by hand as far as is possible and then by moving the lever 9 to the left. The screw 22 will materially assist in forcing the portion R into proper position with respect to the portion R'.

It will be gathered from the foregoing that the use of the device requires little or no skill and because of its simplicity the cost of production of the invention is quite inexpensive and due to the pivotal arrangement of the elements of the device with respect to the lever thereof, the tool when not in use will require but small amount of space for storage.

In order to hold the ends of the rim in the position shown in Figure 2, especially when pressure has been released from the lever 9, I provide a pivotal hook 11 on the end of the lever that is adapted to engage a portion of the rim adjacent said end of the lever. The work of repair to a tire may thus be accomplished without fear of the rim returning to its normal position.

Having described my invention, what I claim and desire to secure by Letters-Patent is:—

A rim tool, the combination of a lever, a hook pivoted to one end thereof, an arm pivoted to the opposite end of the lever, a collar slidable on the lever, a second arm having a bifurcated end that is pivoted to the collar, a bearing screw arranged in the second arm and identically arranged clamping jaws formed on the ends of both arms and comprising, body portions arranged adjacent each other and having locked flanges, an arm formed on one of the body portions, a lateral end formed on the arm, a U bracket secured to the opposing body portion and pivotally secured to the lateral end of the arm and a screw adapted to pass through the body portions and having a thumb-nut for increasing or decreasing the space between the body portions.

In testimony whereof I have hereunto set my hand.

WILLIAM F. GRAFFIS.